United States Patent
Ohno

[19]

[11] Patent Number: 5,953,349
[45] Date of Patent: Sep. 14, 1999

[54] DATA VARIATION DETECTING SYSTEM

[75] Inventor: Katsumaru Ohno, Tokyo, Japan

[73] Assignee: NEC Corporation, Tokyo, Japan

[21] Appl. No.: 08/992,956

[22] Filed: Dec. 18, 1997

[30] Foreign Application Priority Data

Dec. 25, 1996 [JP] Japan .................................. 8-344356

[51] Int. Cl.$^6$ ..................................................... H04J 3/06
[52] U.S. Cl. ............................ 370/509; 370/514; 370/517
[58] Field of Search ..................................... 370/552, 503, 370/506, 509, 512, 514, 517, 401, 389, 392

[56] References Cited

U.S. PATENT DOCUMENTS 5,583,855  12/1996  Ball ........................................ 370/460
5,784,380   7/1998  Kuwahara ............................... 370/509

FOREIGN PATENT DOCUMENTS

163-193780  8/1988  Japan .

Primary Examiner—Chau Nguyen
Assistant Examiner—Thinh Vu
Attorney, Agent, or Firm—Whitham, Curtis & Whitham

[57] ABSTRACT

A data variation detecting system can perform detection of data variation at an arbitrary timing without lowering process performance of a processing unit, and without requiring expansion of a memory region in the processing unit. In the data variation detecting system, a recent data and a preceding data are taken from a shift register, are compared by a comparator circuit for detecting whether data variation is present or not by a data variation detecting circuit. The recent data is stored in a memory of an interface circuit with a data holding circuit. A result of detection by the data variation detecting system is directly stored in the memory in the interface circuit. When data variation is detected, operation of storing the recent data by the shift register and the data holding circuit is disabled via a masking circuit. The occurrence of data variation is detected by the processing unit via the interface circuit, the processing unit obtains the recent data from the interface circuit. When a reset signal demanding resumption of the data variation detecting process is input to the interface circuit by the processing unit, the interface circuit outputs the reset signal to a re-timing circuit. The re-timing circuit is responsive to the reset signal for resuming data variation detection at a timing of completion of taking of data in a monitoring zone.

11 Claims, 8 Drawing Sheets

| Address | Content |
|---|---|
| ADDRESS T | LD1 - - - - LDm |
| ADDRESS T+1 | LDm+1 - - - LD2m |
| ADDRESS T+2 | LD2m+1 - - - LD3m |
| ADDRESS T+3 | LD3m+1 - - - LD4m |
| ⋮ | ⋮ |
| ADDRESS T+n/m−1 | LDn−m+1 - - - LDn |
| ⋮ | ⋮ |
| ADDRESS u | RSTED, RESET, DH |

DATA VARIATION DETECTING SYSTEM

BACKGROUND OF THE INVENTION

1. Field of the Invention

The present invention relates generally to a data variation detecting system. More specifically, the invention relates to a data variation detecting system which monitors a portion, on which a control information is multiplexed, in a sequence of data, and modifies a control on the basis of a new control information when data in a monitored zone is varied.

2. Description of the Related Art

Figure 7:
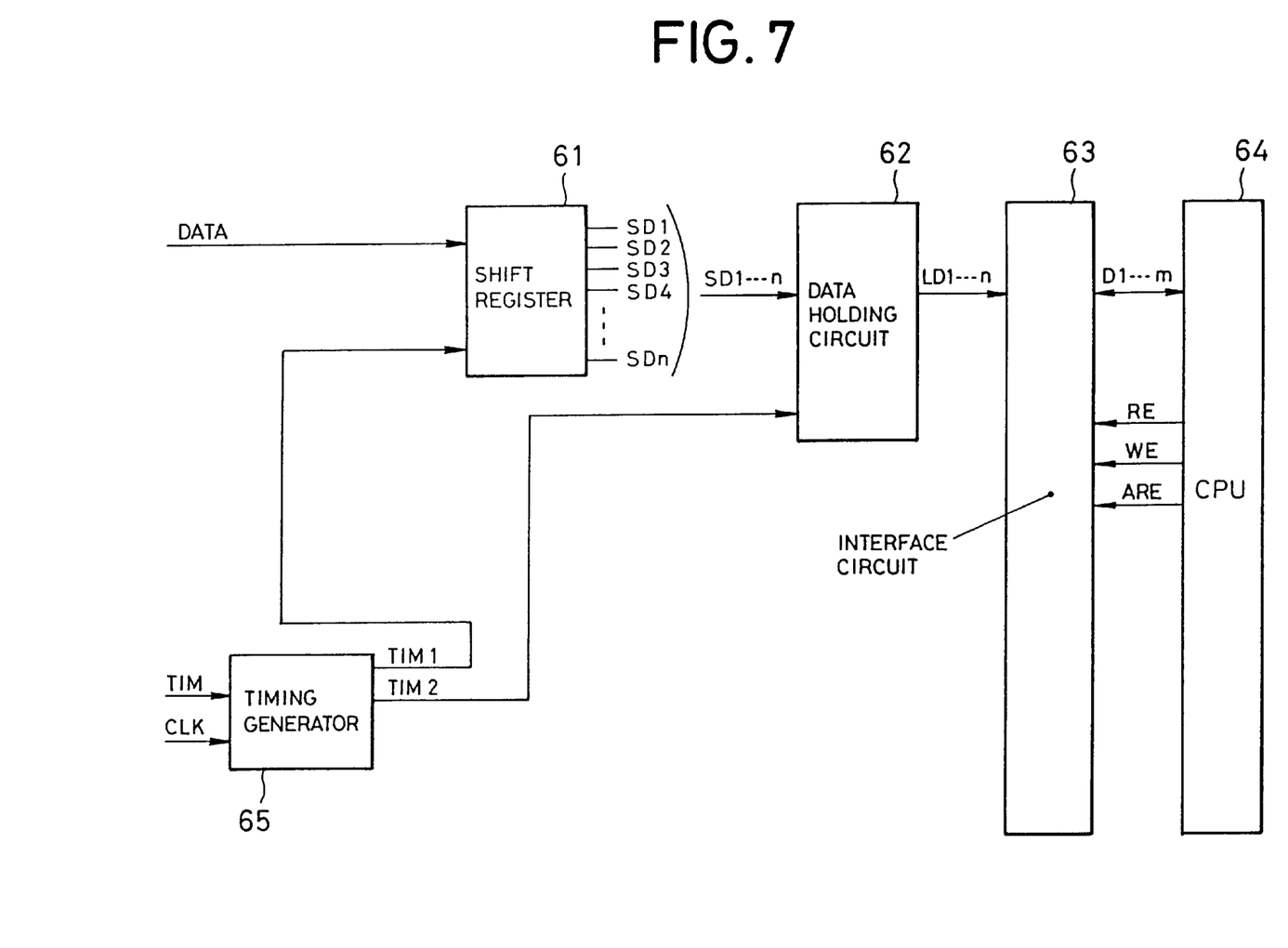
FIG. 7 is a block diagram showing a construction of the conventional data variation detecting system.

FIG. 7 is a block diagram showing one example of the conventional data variation detecting system. The conventional data variation detecting system includes a shift register 61 for taking data within a monitoring zone from a series of input data (DATA) as an n-bit (n is positive integer) parallel data, a data holding circuit always storing a most recent parallel data taken by the shift register 61, an interface circuit (CPUINTF) having a memory (not shown) temporarily storing the parallel data stored in the data holding circuit 62, a processing unit (CPU) 64 exchanging data with the interface circuit 63, and a timing generator 65 generating a timing of the monitoring zone and data holding.

By a timing signal TIM1 generated by the timing generator 65, the n-bit input signal SD1 to SDn of the monitoring zone is stored in the shift register 61. Then, the n-bit input signal is stored in the data holding circuit 62 by a timing signal TIM2. Then, the data LD1 to LDn stored in the data holding circuit 62 is input to the processing unit 64 via the interface circuit 63. It should be noted that TIM input to the timing generator 65 are timing pulses indicative of the monitoring zones in a series of data, and CLK is a reference clock of the data.

On the other hand, the processing unit 64 is designed to perform transmission and reception of signal per m bits (m is positive integer, and is a number establishing (n/m)= integer). Accordingly, the processing unit 64 performs data request for (n/m) times for the interface circuit 63 in order to take n bits of data.

On the other hand, the reference sign RE denotes a read enable signal for a bus, the reference sign WE denotes a write enable signal for the bus, and the reference sign ARE denotes an address output timing signal, respectively.

Figure 8:
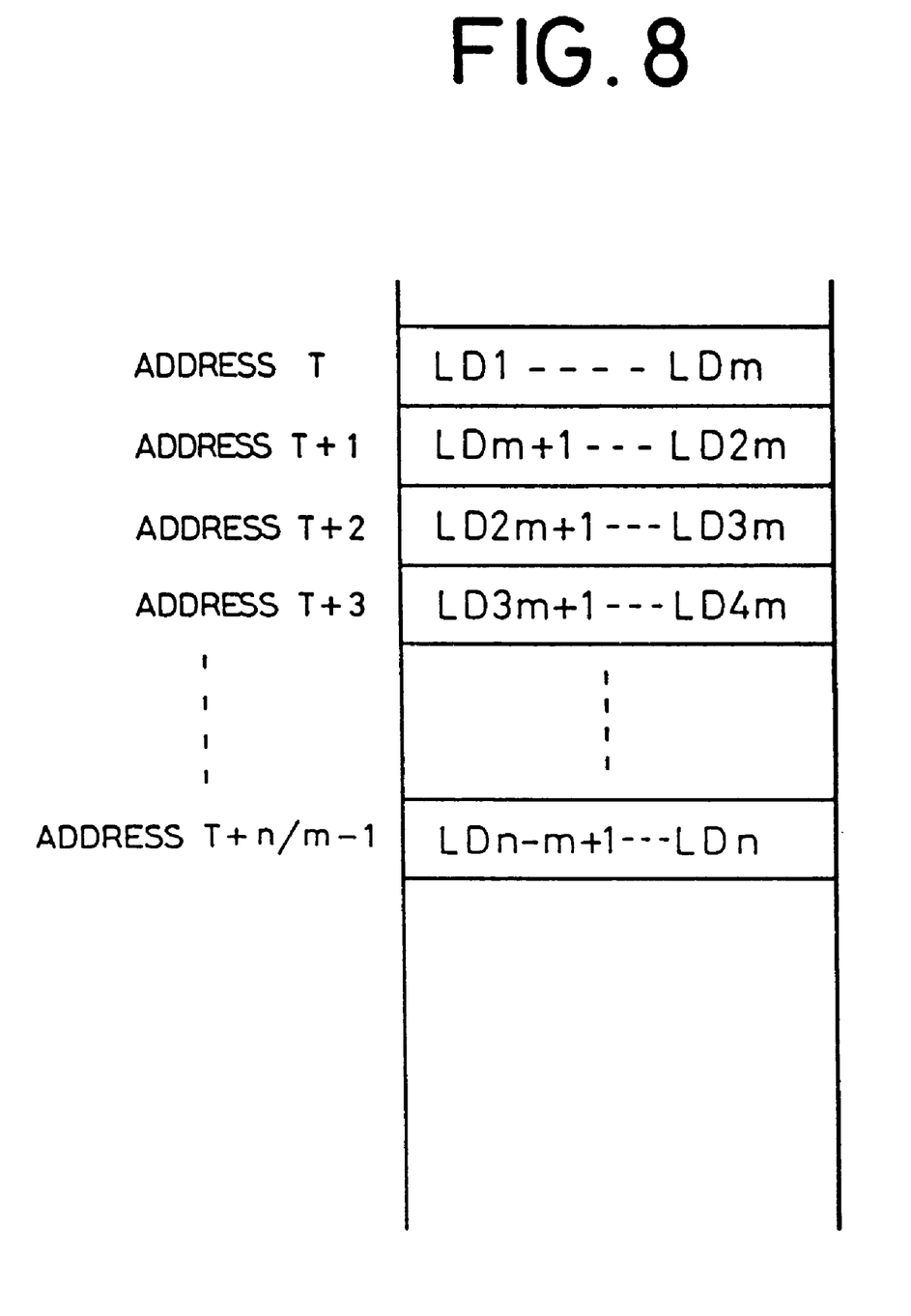
FIG. 8 is a chart of a memory map in the interface circuit of the conventional data variation detecting circuit.

FIG. 8 is a memory map chart in the interface circuit 63. FIG. 8 shows that the input data is stored in different addressed per m bits. Then, these data LD1 to LDn are output to the processing unit 64 according to control of the RE, WE and data D1 to Dm.

Figure 9:
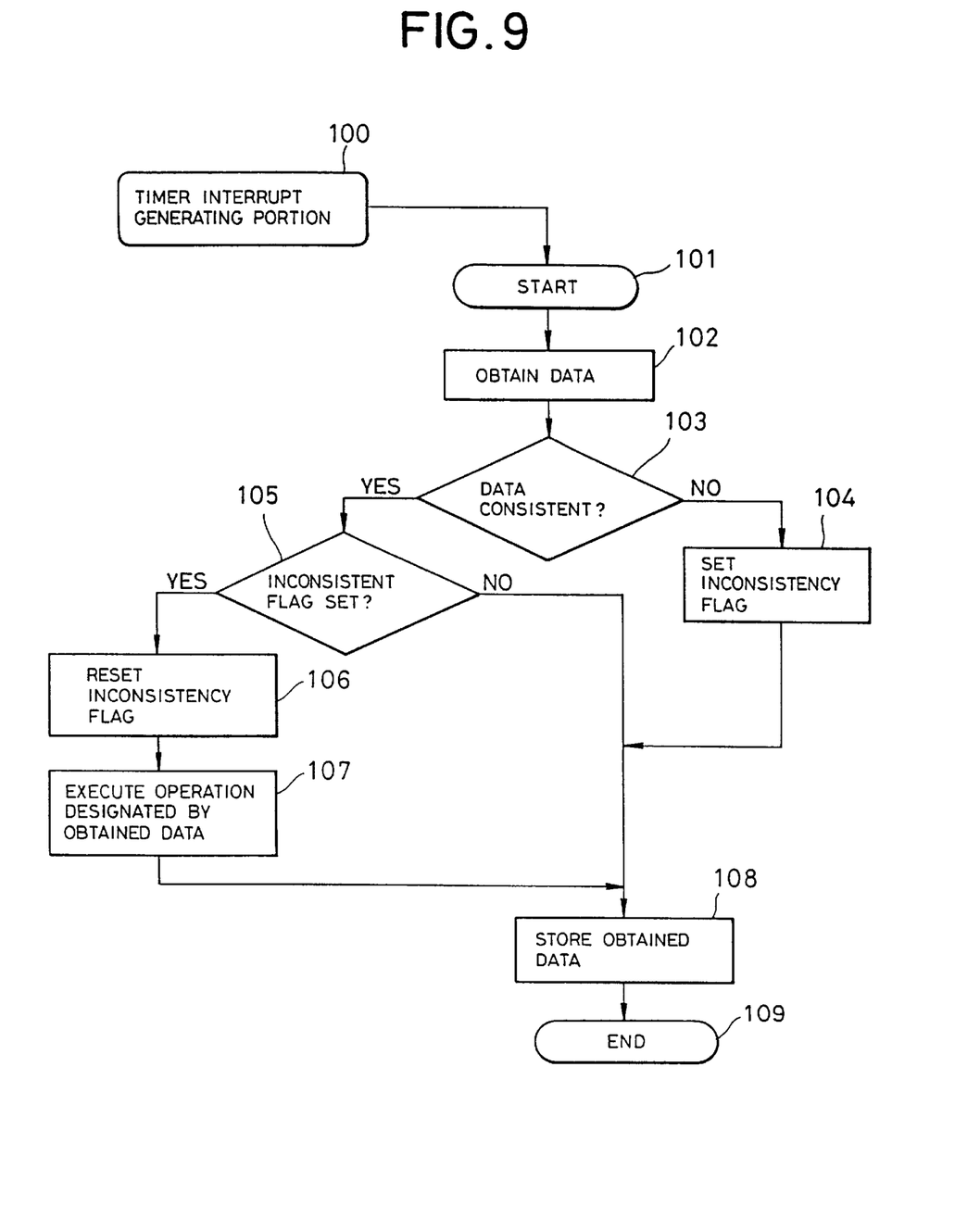
FIG. 9 is a flowchart showing operation of the conventional data variation detecting system.

Next, the operation of the processing unit 64 will be discussed. FIG. 9 is a flowchart showing operation of the processing unit 64.

Referring to FIG. 9, a timer interrupt generating portion which is provided in the processing unit 64, generates a timer interrupt in a period longer than the monitoring zone (step 100) and whereby start operation (step 101).

Next, the processing unit 64 obtains the monitoring zone data from the interface circuit 63 (step 102). The memory map in the interface circuit 63 is provided a structure as shown in FIG. 8. Therefore, the processing unit 64 issues read instruction for (n/m) times in total in order to obtain all data in the n bit of monitoring zone.

Next, the processing unit 64 makes judgement whether the currently obtained data is consistent with the data on the obtained in the immediately preceding timing (step 103). If the currently obtained data is not consistent with the data obtained in the immediately preceding timing, a inconsistency flag is set ON (step 104), and the data obtained in the immediately preceding timing is updated by the currently obtained data (step 108). Thereafter, process goes end to return (RTN) to other process which has been interrupted by the read instruction (step 109).

On the other hand, when the currently obtained data is consistent with the data obtained in the immediately preceding timing, check is performed whether the inconsistency flag is ON (step 105). If the inconsistency flag is OFF, the data obtained in the immediately preceding timing is updated by the currently obtained data (step 108). Thereafter, process goes end to return (RTN) to other process which has been interrupted by the read instruction (step 109).

If the inconsistency flag is ON, the inconsistency flag is reset to OFF (step 106). At this time, the processing unit 64 judges that the monitoring zone data is varied to execute operation on the basis of the data obtained at step 102, namely on the basis of the most recent control information (step 107). Then, the data obtained in the immediately preceding timing is updated by the currently obtained data (step 108). Thereafter, process goes end to return (RTN) to other process which has been interrupted by the read instruction (step 109).

Here, only when the currently obtained data is consistent with the data obtained in the immediately preceding timing (step 103), and at that timing, the inconsistency flag has already ON (step 105), judgment is made that the monitoring zone data is varied. This is because that only setting ON of the inconsistency flag is not sufficient for accurately detect variation of data for possibility of occurrence of data error on a transmission line.

Accordingly, once the compared data becomes inconsistent to cause setting ON of the inconsistency flag, and, in the subsequent comparison, the compared data are consistent with each other, inconsistency is judged and whereby variation of data is judged. Namely, the conventional technology has been worked out under the premise that the same data is sequentially input for two or more times.

On the other hand, Japanese Unexamined Patent Publication No. Showa 63-193780 discloses a circuit, in which CPU is operated on the basis of data obtained by a separation circuit.

In the shown circuit, when a vertical synchronization pulse separated by a vertical synchronization pulse separation circuit is supplied to a latching circuit and CPU, respectively, an output of a counter circuit is latched, and the counted output of the counter circuit is input to CPU through a data bus.

In CPU, judgment process is performed on the basis of the counted value at the timing of the preceding vertical synchronization pulse and the timing of the current vertical synchronization pulse. Thus, the vertical synchronization pulse is output as effect when the result of judgment satisfies the predetermined condition.

However, these conventional data variation detection system performs detection of the data variation in the processing unit. Therefore, a period required for this process reduces a period for other processes to cause lowering of process performance of the processing unit.

On the other hand, upon comparison, it is necessary to store the data obtained in the preceding timing in the processing system to require extra memory region for storing such data.

Furthermore, since variation of data is performed by timer interrupt, variation of data can be detected only at the predetermined timing for timer interrupt.

SUMMARY OF THE INVENTION

Therefore, it is an object of the present invention to provide a data variation detecting system which can detect variation of data at an arbitrary timing without causing lowering of process performance of a processing unit and requiring expansion of a memory region in the processing unit.

According to one aspect of the invention, a data variation detecting system detecting the variation of input, comprises:

comparing means for comprising a most recent input data and a preceding input data;

data variation judging means for performing judgment of data variation on the basis of result of comparison by the comparing means;

most recent input data storage means for constantly storing the most recent input data;

a processing unit; and output means outputting for the result of judgment in the data variation judging means and the most recent input data stored in the most recent input data storage means to the processing unit.

The data variation detecting system may further comprises disabling means for disabling comparison by the comparing means and storing of the most recent input data in the most recent input data storage means when variation of data is caused by the data variation judging means. In addition, the data variation detecting system may further comprises resuming means for resuming comparison of the comparing means and storing of the most recent input data in the most recent input data storage means which are disabled by the disabling means, in response to a demand from the processing unit. In the later case, the resuming means may include notifying means for notifying a resuming state to the processing unit until inputting of the most recent input data is completed, in responsive to a demand from the processing unit.

The processing unit may input the most recent input data when variation of data is judged by the data variation judgment means and when a notice indicative of resuming state from the notifying means is not issued.

The output means may has a storage portion for storing the most recent input data, the result of judgment in the data variation judging means, the demand from the processing unit and a notifying information from the notifying means. Also, the output means may output the demand from the processing unit stored in the storage portion to the resuming means. The output means may output the most recent input data stored in the storage portion and the result of judgment to the processing unit. The output means may output the notice information stored in the storage means to the processing unit.

The data variation judgement means may make judgment of variation of data when inconsistency is detected by the comparing means and consistency is established in a next comparison.

According to the present invention, comparison of input data and storing of the preceding input data is performed by comparison means and most recent input data storage means which are provided externally to the processing unit.

According to the present invention, when variation of data is present, operation of comparison of data and storing of data are stopped. Thereafter, after detection of data variation, the most recent data can be output from a most recent data storage means at an arbitrary timing.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

Figure 1:
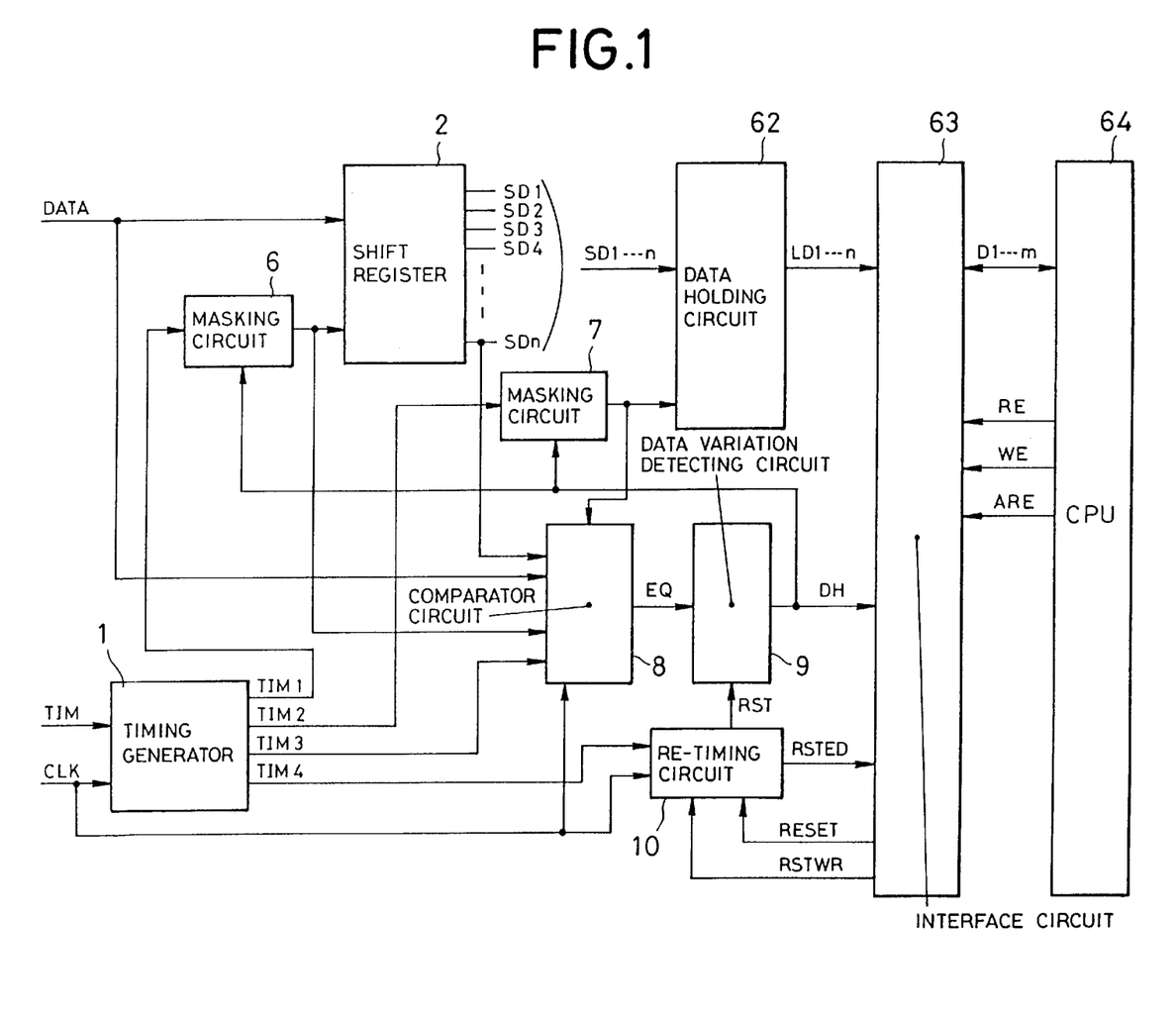
FIG. 1 is a block diagram showing a construction of the preferred embodiment of a data variation detecting system according to the present invention.

FIG. 1 is a block diagram showing a construction of the preferred embodiment of a data variation detecting system according to the present invention. It should be noted that like elements and signals to those common to the prior art (FIG. 7) will be identified by like reference numerals and reference signs and description thereof will be neglected for avoiding redundant discussion for keeping the disclosure simple enough to facilitate clear understanding of the present invention.

The preferred embodiment of the data variation detecting system according to the present invention includes the shift register 2 taking data in the monitoring zone from a sequentially input data as n-bit parallel data SD1 to SDn, the data holding circuit 62 constantly storing the most recent parallel data taken in the shift register 2, the interface circuit 63 having a memory (not shown) temporarily storing parallel data LD1 to LDn stored in the data holding circuit 62, the processing unit 64 exchanging data D1 to Dm with the interface circuit 63, a timing generator 1 generating a timing of the monitoring zone and a timing of data holding or so forth, a comparator circuit 8 performing comparison of the most recent or current data and the preceding data on the basis of data output from the shift register 2, a data variation detecting circuit 9 performs judgment whether data is varied or not on the basis of result of comparison output from the comparator circuit 8, a re-timing circuit 10 resuming detection of the data variation detecting circuit 9 on the basis of a reset signal (RESET) input from the processing unit 64 via the interface circuit 63, and masking circuits 6 and 7 stopping operation of the data holding circuit 62 and the comparator circuit 8.

Figure 2:
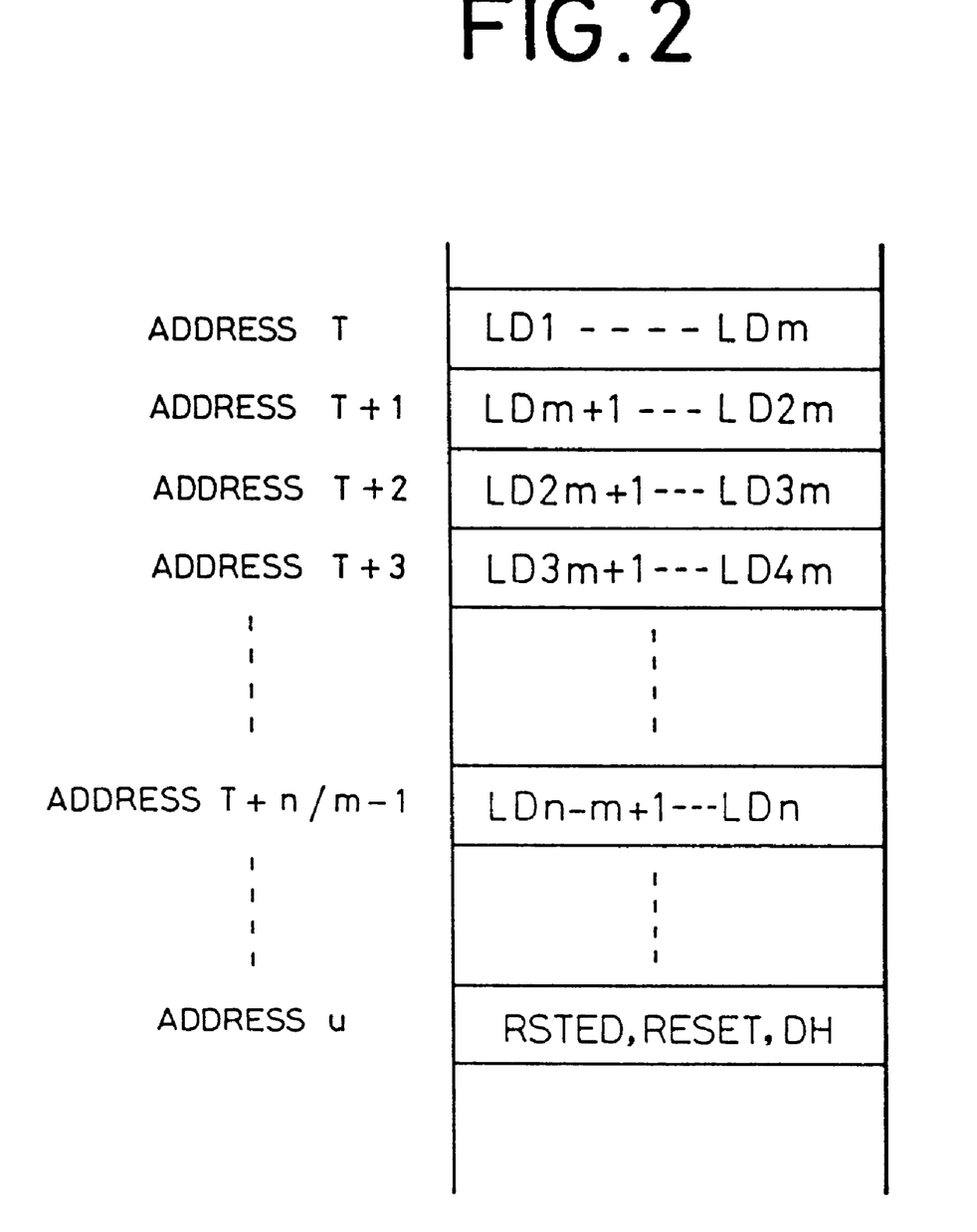
FIG. 2 is a chart of a memory map in an interface circuit.

FIG. 2 is a chart of the memory map in the interface circuit 63. The memory region is differentiated from the conventional memory region (see FIG. 8) in that a region for storing RSTED, RESET and DH signals discussed later is provided as an address U. Other regions are the same as those in the prior art.

Figure 3:
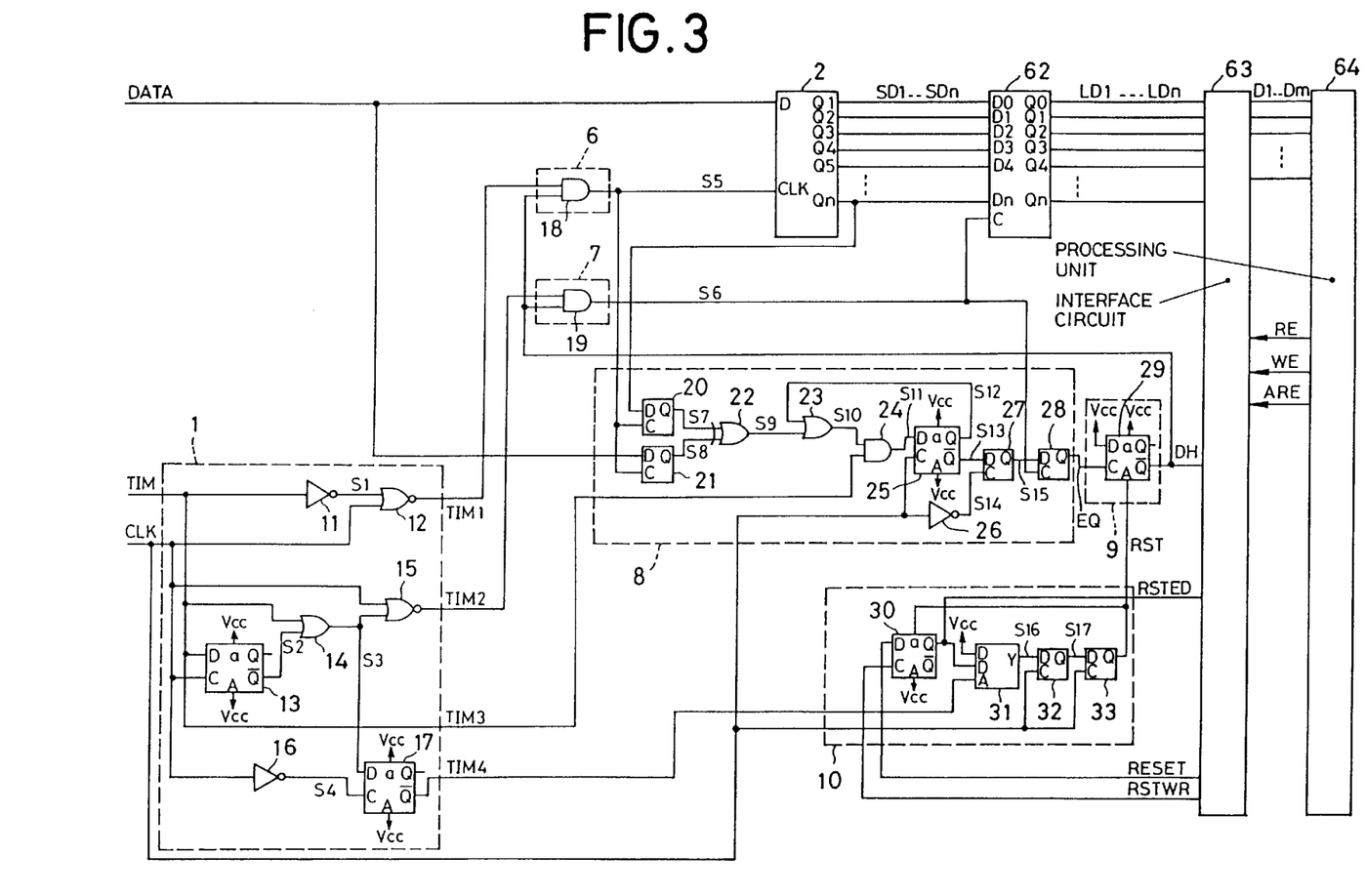
FIG. 3 is a circuit diagram of the preferred embodiment of the data variation detecting system of the present invention.
Figure 4:
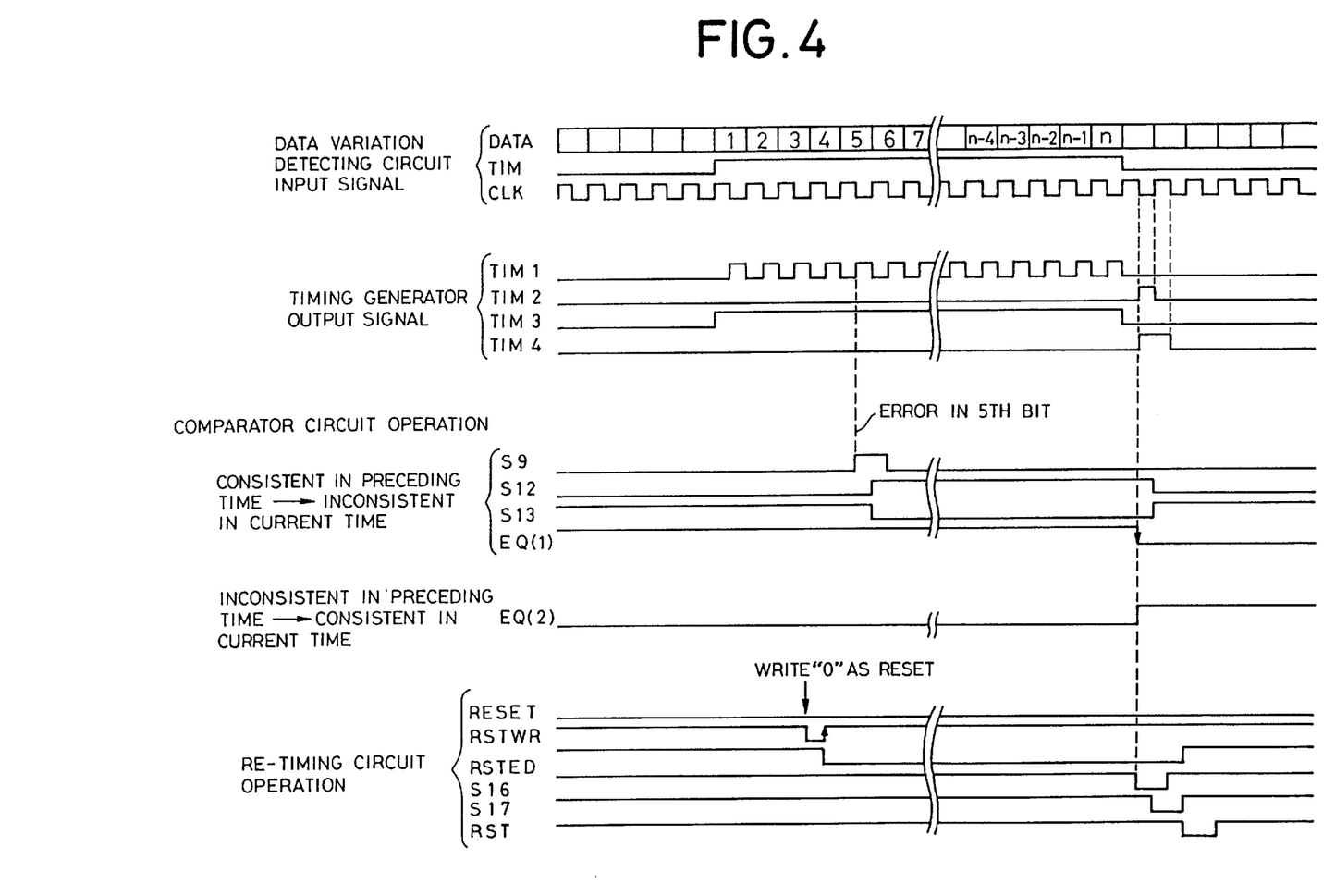
FIG. 4 is a timing chart showing operation of the preferred embodiment of the data variation detecting system of the present invention.
Figure 5:
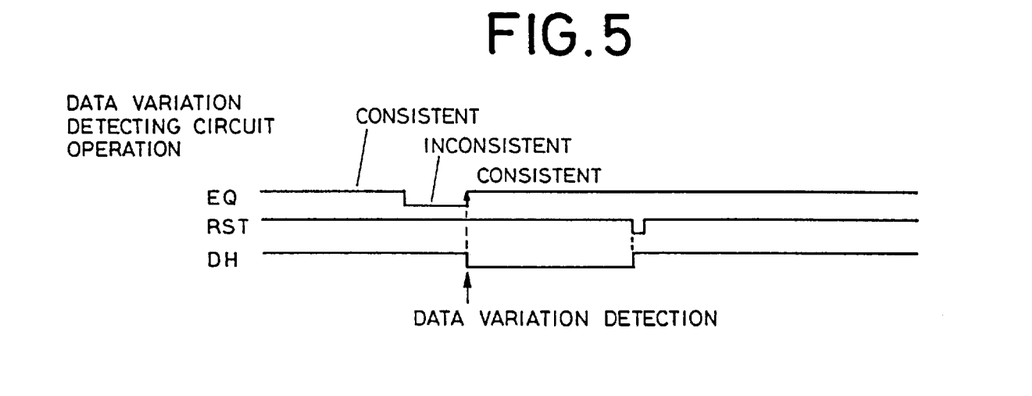
FIG. 5 is a timing chart showing operation of the preferred embodiment of the data variation detecting system of the present invention.

FIG. 3 is a circuit diagram of the data variation detecting circuit, and FIGS. 4 and 5 are timing charts showing operation of the system.

In FIG. 3, a timing pulse TIM showing the monitoring zone in the series of data and the reference clock CLK of data are input to the timing generator 1 in the same manner as the prior art.

The timing pulse TIM1 output from the timing generator 1 sets an operation timing of the shift register 2. The timing pulse TIM1 is output from an inverter 11 and OR circuit 12.

DATA, TIM and CLK in FIG. 4 represent waveforms of signals input to the timing generator 1 and a waveform of an input signal. Namely, when the timing pulse TIM becomes high level (H), data (DATA) is input to the data variation detecting system per one bit at rising timing of the clock signal (CLK). When input data reaches n bits, the timing pulse TIM turns into low (L) level.

Returning to the timing generator 1 of FIG. 3, the timing pulse TIM is input to the inverter 11 and the output of the inverter 11 is input to one of the input terminals of the OR circuit 12. Then, as an output of the OR circuit 12, a timing pulse TIM1 is obtained. On the other hand, a clock signal is input to the other input terminal of the OR circuit 12.

Accordingly, as shown by TIM1 to TIM4 of FIG. 4, as the timing pulse TIM1, the waveform output only in the monitoring zone TIM can be obtained.

Next, the timing pulse TIM2 sets a timing, in which the data holding circuit 62 takes the monitoring zone data.

Referring to the timing generator 1 of FIG. 1, the timing pulse TIM2 is output from a circuit constituted of a D-flip flop (hereinafter referred to as D.FF) 13 and OR circuits 14 and 15.

The clock signal is input to a clock input of the D.FF 13 and one of the input terminals of the OR circuit 15. On the other hand, the timing pulse TIM is input to one of the input terminals of the OR circuit 14 and a data input terminal of the D.FF 13. On the other hand, an inverted output of the D.FF 13 is input to the other input terminal of the OR circuit 14. An output of the OR circuit 14 is input to the other input terminal of the OR circuit 15. Then, the timing pulse TIM2 is output from the OR circuit 15.

The timing pulse TIM3 sets a period for continuing the comparing operation. The timing pulse TIM3 is the same signal as the timing pulse TIM.

The timing pulse TIM4 sets a timing for outputting the RST signal which will be discussed later.

The timing pulse TIM4 is output from a circuit which is constituted of an inverter 16 and a D.FF 17.

Then, the clock signal is input to the inverter 16. The output of the inverter 16 is input to a clock input terminal of the D.FF 17. On the other hand, an inverted output of the D.FF 17 is output as the timing pulse TIM4. On the other hand, the output of the OR circuit 14 is also input to the data input terminal of the D.FF 17.

By the circuit set forth above, with reference to TIM1 to TIM4 of FIG. 4, after falling of the timing pulse TIM as the timing pulse TIM2, a signal rising at a first falling timing of the clock signal and falling at a next rising timing of the clock signal, can be obtained.

Similarly, as a timing pulse TIM4, a signal rising at substantially the same timing as rising of the timing pulse TIM2 and falling at a timing delayed for a half period of the clock signal from the falling timing of the timing pulse TIM2, can be obtained.

Next, discussion will be given with respect to the comparator circuit 8. Returning to FIG. 3, the comparator circuit 8 is constructed with D.FFs 20, 21, 25 and 27, an exclusive OR (EX.OR) 22, an OR circuit 23, an AND circuit 24, an inverter 26 and a latching buffer 28.

It should be noted that while discussion will be given later in connection with the AND circuits 6 and 7, for convenience of disclosure, it is assumed that the timing pulses TIM1 and TIM2 are constantly output from the AND circuits 6 and 7, respectively.

To a clock input terminals of the D.FFs 20 and 21, the timing pulse TIM1 is input. To a data input terminal of the D.FF 20, the output from the shift register 2 is input. To a data input terminal of the D.FF 21, an input data (DATA) is input.

On the other hand, non-inverted outputs of the D.FFs 20 and 21 are input to both of respective inputs of the exclusive OR circuit 22.

An output of the OR circuit 23 is input to one of the input terminals of the AND circuit 24, and an output of the AND circuit 24 is input to a data input terminal of the D.FF 25.

A non-inverted output of the D.FF 25 is input to the other input terminal of the OR circuit 23. On the other hand, an inverted output of the D.FF 25 is input to a data input terminal of the D.FF 27.

To a clock input terminal of the D.FF 25 and the inverter 26, the clock signal is input. An output of the inverter 26 is input to a clock input terminal of the D.FF 27.

A non-inverted output of the D.FF 27 is input to an input terminal of the latching buffer 28, and the timing pulse TIM2 is input to a clock input terminal of the D.FF 28.

Then, a comparison result signal EQ is output from the latching buffer 28.

It should be noted that the timing pulse TIM3 is input to the other input of the AND circuit 24.

The operation of the comparator circuit 8 will be discussed briefly. To a data input terminal of the D.FF 20, a preceding input data is sequentially input from the leading bit. On the other hand, to a data input terminal of the D.FF 21, the most recent or current input data is sequentially input from the leading bit. Inputting of the preceding input data and inputting of the most recent input data are performed synchronously.

Namely, corresponding bits of the most recent input data and the preceding input data are input to exclusive OR circuit 22 per one bit in synchronism with the timing pulse TIM1, and comparison of bits is performed by the exclusive OR circuit 22. When the result of comparison shows consistency of the most recent input data and the preceding input data, a low level signal is output from the exclusive OR circuit 22. Conversely, when the result of comparison shows inconsistency of the input data, a high level signal is output.

When the result of comparison of the most recent input data and the preceding data are consistent, the output of the exclusive OR circuit 22 is low level and the output of the OR circuit 23 is low level, and the output of the AND circuit 24 also becomes low level. Accordingly, the D.FF 25 is reset by rising of the clock signal. Then, the inverted output of the D.FF 25 becomes high level.

At a falling timing of the clock signal, the D.FF 27 is set. The non-inverted of the D.FF 27 becomes high level.

A high level signal is input to the latching buffer 28 at the rising of the timing pulse TIM2. An output of the latching buffer 28 becomes high level.

On the other hand, when the result of comparison of the most recent input data and the preceding input data shows inconsistency thereof, the output of the exclusive OR circuit 22 becomes high level. Then, the output of the OR circuit 23 also becomes high level. Accordingly, at rising of the timing pulse TIM3, the output of the AND circuit 24 becomes high level.

Accordingly, at rising of the clock signal, the D.FF 25 is set, and the inverted output of the D.FF 25 becomes low level.

Then, at the falling timing of the clock signal, the D.FF 27 is reset, and the non-inverted output of the D.FF 27 becomes low level.

The low level signal is input to the latching buffer 28 at rising of the timing pulse TIM2. Then, the output of the latching buffer 28 becomes low level.

The operation timing of the comparator circuit 8 is shown by S9, S12, S13 and EQ(1) of FIG. 4.

S9, S12, S13 and EQ(1) of FIG. 4 show operation timing in the case where the result of preceding comparison shows consistency and the result of current comparison shows inconsistency. On the other hand, the result of current comparison represents the case where inconsistency is caused at fifth bit. In this case, the output of the latching buffer 28 varies from high level to low level.

EQ(2) of FIG. 4 shows a timing when the result of the preceding comparison shows inconsistency and the result of current comparison shows consistency. It should be noted that FIG. 4 shows only output of the latching buffer 28 and neglects other timing. In this case, the output of the latching buffer 28 is varied from low level to high level.

Next, discussion will be given with respect to the data variation detection circuit 9. The data variation detection circuit 9 is constructed with a D.FF 29. The output of the latching buffer 28 is input to a clock input terminal of the D.FF 29. On the other hand, the voltage of the high level is applied to the data input of the D.FF 29. Then, an output is taken from an inverted output of the D.FF 29.

Namely, when the result of the preceding comparison is inconsistent and the result of the current comparison is consistent, the D.FF 29 is set. At this time, the output signal DH is low level.

The output signal DH is stored in the address U of the memory in the interface circuit 63.

On the other hand, the processing unit 64 regularly monitors the output signal DH. The processing unit 64 obtains the output signal DH from the interface circuit 63 on the basis of RE, WE and ARE signals shown in FIG. 3. At the same time, a data detection resumption processing information RSTED which will be discussed later, is obtained.

Next, discussion will be given with respect to the masking circuits 6 and 7. To the masking circuit 6, the timing pulse TIM1 and the output signal DH of the D.FF 29 are input. Then, the output signal of the masking circuit 6 is input to the clock input terminal of the shift register 2.

Namely, when the output signal DH of the D.FF 29 is low level, the timing pulse TIM1 is not output from the masking circuit 6. Accordingly, the operation of the shift register 2 is stopped. This means that when the output signal DH of the D.FF 29 becomes low level, and in other words, when the variation of the input data is detected, the operation of the shift register 2 is stopped.

On the other hand, to the masking circuit 7, the timing pulse TIM2 and the output signal DH of the D.FF 29 are input. Then, the output signal S6 of the making circuit 7 is input to the data holding circuit 62 and the clock input terminal of the latching buffer 28.

Namely, when the output signal DH of the D.FF 29 is low level, the timing pulse TIM2 is not output from the masking circuit 7. Accordingly, the operations of the data holding circuit 62 and the latching buffer 28 are stopped.

This represents that when variation of input data is detected, the operations of the data holding circuit 62 and the latching buffer 28 are stopped.

Next, discussion will be given with respect to the re-timing circuit 10. The re-timing circuit 10 is constructed with D.FFs 30, 32, 33 and selector 31.

On a clock input terminal of the D.FF 30, the signal RST WR is input to from the interface circuit 63. To the data input terminal of the D.FF 30, the reset signal RESET is similarly input through the interface circuit 63, Then, the non-inverted output of the D.FF 30 is input to a data input terminal of selector 31.

The output of the selector 31 is input to a data input terminal of the D.FF 32. On the other hand, the clock signal is input to a clock input terminal of the D.FF 32.

The non-inverted output of the D.FF 32 is input to a data input terminal of the D.FF 33. On the other hand, the clock signal is input to a clock input terminal of the D.FF 33.

On the other hand, the non-inverted output of the D.FF 30 is output to the interface circuit 63 as the signal RSTED.

Next, discussion will be given for operation of the re-timing circuit 10 with reference to RESET, RSTWR, RSTED, S11 and S17 of FIG. 4. When the processing unit 64 writes a low level signal as the reset signal RESET to the address U (see FIG. 2) of the memory in the interface circuit 63, the interface circuit 63 outputs the low level pulse RSTWR at the timing shown in FIG. 4. The low level reset signal RESET is a signal demanding resumption of the data variation detecting process.

When the low level reset signal RESET and the low level pulse RSTWR are input to the D.FF 30, the non-inverted output becomes low level. The low level signal is then input to the selector 31. The selector 31 outputs a low level signal S16 at rising of the timing pulse TIM4.

Also, the low level signal S16 is input to the D.FF 32. The D.FF 32 outputs a low level signal S17 at rising of the clock signal CLK.

Furthermore, the low level signal S17 is input to the D.FF 33. The D.FF 33 outputs the low level signal RST at rising of the clock signal CLK.

By the low level signal RST, the D.FF 29 is reset to turn the signal DH into high level.

This reset signal resets the detection information DH of data variation and resumes operations for taking the monitoring zone data upon variation of data, detection of consistency and detection of data variation.

Then, the re-timing circuit 10 is designed to output the reset signal RESET input from the processing unit 64 as the RST signal with a predetermined time of delay.

The predetermined period is a period where the signal RSTED is held at low level, as shown in FIG. 4. This is the period from inputting of the reset signal RESET to outputting of the result EQ of comparison by the D.FF 28, namely the period up to rising of the signal S17 from low level, and more specifically, the period for taking the monitoring zone data upon variation of data, detection of consistency and detection of data variation (in more detail, a period from rising of the timing pulse TIM1 to falling of the timing pulse TIM4).

Namely, the reset signal RESET from the processing unit 64 is input at an arbitrary timing. When the reset signal RESET is input at an intermediate timing in the monitoring zone, it is possible to resume monitoring from the intermediate timing of the timing pulse TIM1, for example. Then, data cannot be taken correctly.

Therefore, when the reset signal RESET is input from the processing unit 64, the RST signal is output waiting falling of the timing pulse TIM4.

Then, in order to notice the resumption processing state to the control unit 64, a signal RSTED indicative of the resumption processing state is output to the processing unit 64 via the interface circuit 63.

FIG. 5 shows a timing of detection of inconsistency of the preceding timing by rising of the comparison result signal EQ from low level to high level and consistency of in the current comparison, detection of variation of data by variation of the detection information DH of detection of data variation from high level to low level, and resetting of the detection information of data variation by the RST signal.

Figure 6:
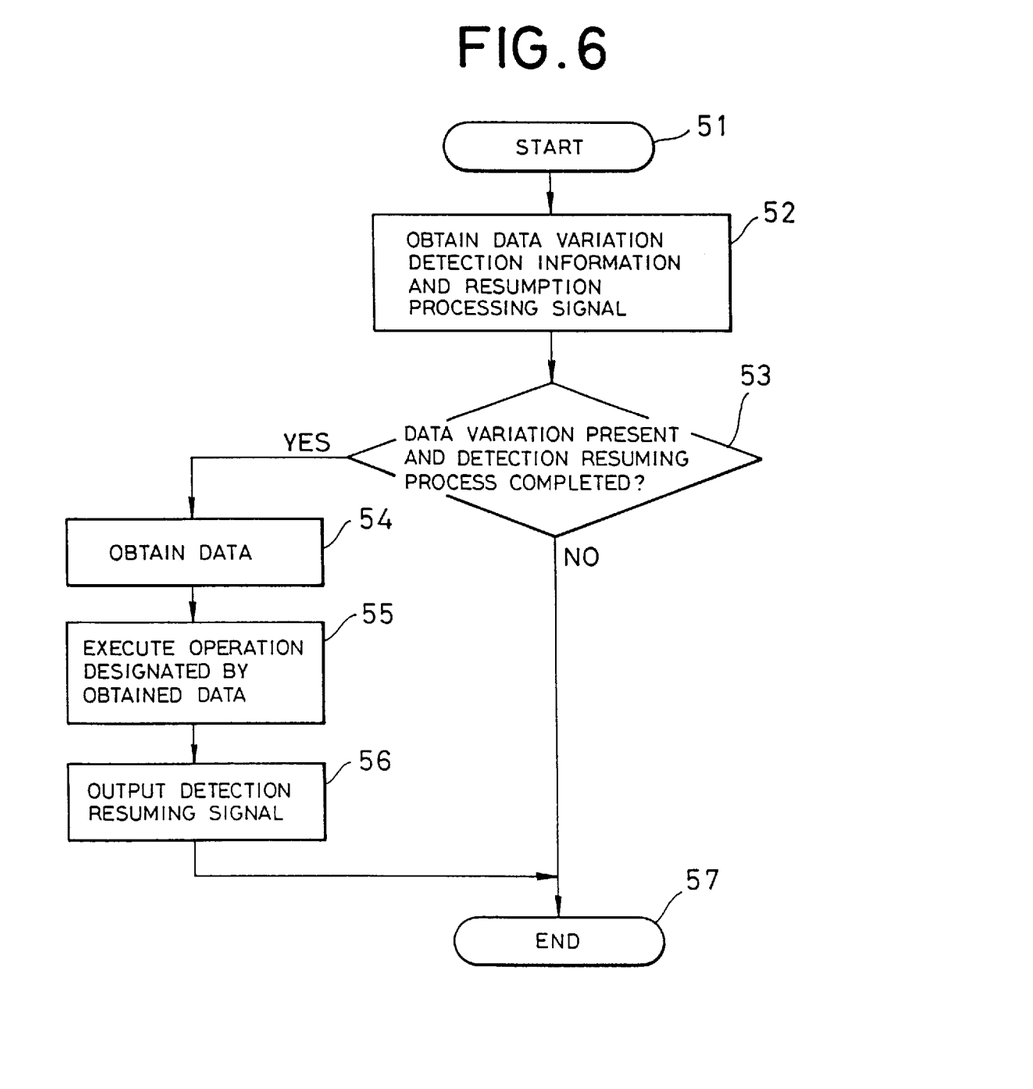
FIG. 6 is a flowchart showing operation of the preferred embodiment of the data variation detecting system of the present invention.

Next, the operation of the processing unit 64 will be discussed. FIG. 6 is a flowchart showing the operation of the processing unit 64.

When the operation is initiated (step 51), the processing unit 64 obtains the data variation detecting information DH and the resumption processing signal RSTED from the address U of the memory in the interface circuit 63 (step 52).

Next, the processing unit 64 checks whether the data variation is present and resumption process is completed or not on the basis of two information (step 53).

Then, when at least one of data is not varied or resumption is in process, operation is terminated without performing data obtaining process (step 57).

On the other hand, when the data variation is present and resumption process is completed, the processing unit 64 obtains the recent input data held in the data holding circuit 62 via the interface circuit 63 (step 54), It should be noted when variation of data is present, subsequent comparison process or so forth is terminated as set forth above.

Next, the content designated by the obtained data is executed (step 55).

Then, the reset signal RESET demanding resumption of detection is output to the re-timing circuit 10 via the interface circuit 63 (step 56).

By this, a process of data variation is resumed, and operation goes END (step 57).

According to the present invention, the data variation detecting system detecting the variation of input is constructed with comparing means comprising the recent input data and the preceding input data, data variation judging means performing judgment of data variation on the basis of result of comparison by the comparing means, recent input data storage means constantly storing the most recent input data, and output means outputting the result of judgment in the data variation judging means and the most recent input data stored in the most recent input data storage means to an external processing unit. Therefore, it becomes unnecessary to provide the comparison means and storage means for storing the preceding data in the processing unit.

Namely, since it is not necessary to provide the comparison means in the processing unit, the performance of the processing unit is increased.

On the other hand, since it is unnecessary to provide storage means for storing the preceding data in the processing unit, down-sizing and lowering of cost can be achieved.

According to another aspect of the invention, disabling means for disabling comparison by the comparing means and storing of the most recent input data in the most recent input data storage means when variation of data is caused by the data variation judging means, is further provided in the data variation detecting system, the most recent data can be output from the most recent input data storage means at any arbitrary timing.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data variation detecting system detecting the variation of input, comprising:
    comparing means for comparing a most recent input data and a preceding input data;
    data variation judging means for performing judgment of data variation on the basis of result of comparison by said comparing means;
    most recent input data storage means for constantly storing said most recent input data;
    a processing unit performing a process according to the result of judgment of data variation and said most recent data input; and
    output means for outputting the result of judgment in said data variation judging means and the most recent input data stored in said most recent input data storage means to said processing unit.

2. A data variation detecting system as set forth in claim 1, which further comprises disabling means for disabling comparison by the comparing means and storing of the most recent input data in the most recent input data storage means when variation of data is caused by the data variation judging means.

3. A data variation detecting system as set forth in claim 2, which further comprises resuming means for resuming comparison of said comparing means and storing of said most recent input data in said most recent input data storage means which are disabled by said disabling means, in response to a demand from said processing unit.

4. A data variation detecting system as set forth in claim 3, wherein said resuming means includes notifying means for notifying a resuming state to said processing unit until inputting of said most recent input data is completed, in response to a demand from said processing unit.

5. A data variation detecting system as set forth in claim 4, wherein said processing unit inputs said most recent input data when variation of data is judged by said data variation judgment means and when a notice indicative of resuming state from said notifying means is not issued.

6. A data variation detecting system as set forth in claim 5, wherein said output means has a storage portion for storing said most recent input data, the result of judgment in said data variation judging means, said demand from said processing unit and a notifying information from said notifying means.

7. A data variation detecting system as set forth in claim 5, wherein said output means outputs said demand from said processing unit stored in said storage portion to said resuming means.

8. A data variation detecting system as set forth in claim 5, wherein said output means outputs said most recent input data stored in said storage portion and the result of judgment to said processing unit.

9. A data variation detecting system as set forth in claim 5, wherein said output means outputs said notice information stored in said storage means to said processing unit.

10. A data variation detecting system as set forth in claim 1, wherein said data variation judgement means makes judgment of variation of data when inconsistency is detected by said comparing means and consistency is established in a next comparison.

11. A data variation detecting system detecting the variation of input, comprising:

comparing means for comparing a most recent input data and a preceding input data;

data variation judging means for performing judgment of data variation on the basis of result of comparison by said comparing means;

most recent input data storage means for constantly storing said most recent input data;

a processing unit;

output means for outputting the result of judgment in said data variation judging means and the most recent input data stored in said most recent input data storage means to said processing unit;

disabling means for disabling comparison by the comparing means and storing of the most recent input data in the most recent input data storage means when variation of data is caused by the data variation judging means; and resuming means for resuming comparison of said comparing means and storing of said most recent input data in said most recent input data storage means which are disabled by said disabling means, in response to a demand from said processing unit, wherein said resuming means includes notifying means for notifying a resuming state to said processing unit until inputting of said most recent input data is completed, in response to a demand from said processing unit.

* * * * *